United States Patent
Mirza et al.

(10) Patent No.: US 12,526,692 B2
(45) Date of Patent: Jan. 13, 2026

(54) SYSTEM AND METHOD FOR OFFLOADING PCell CARRIER TRAFFIC TO SCell FOR FDD AND TDD 5G NR CARRIER AGGREGATION

(71) Applicant: T-MOBILE INNOVATIONS LLC, Overland Park, KS (US)

(72) Inventors: Mochamad Mirza, Bothell, WA (US); Nishant Patel, Irvine, CA (US); Egil Arnfinn Gronstad, Bellevue, WA (US)

(73) Assignee: T-Mobile, Overland Park, KS (US)

( * ) Notice: Subject to any disclaimer, the term of this patent is extended or adjusted under 35 U.S.C. 154(b) by 404 days.

(21) Appl. No.: 18/102,269

(22) Filed: Jan. 27, 2023

(65) Prior Publication Data

US 2024/0259874 A1 Aug. 1, 2024

(51) Int. Cl.
| H04W 28/02 | (2009.01) |
| H04W 28/08 | (2023.01) |
| H04W 28/084 | (2023.01) |
| H04W 28/086 | (2023.01) |

(52) U.S. Cl.
CPC ... *H04W 28/0933* (2020.05); *H04W 28/0289* (2013.01); *H04W 28/084* (2023.05); *H04W 28/086* (2023.05)

(58) Field of Classification Search
CPC .. H04B 7/2615; H04B 7/2621; H04B 7/2643; H04W 28/0289; H04W 28/084; H04W 28/086; H04W 28/0933
See application file for complete search history.

(56) References Cited

U.S. PATENT DOCUMENTS

| 8,971,182 | B2* | 3/2015 | Lee | H04W 28/0983 370/332 |
| 10,064,166 | B1* | 8/2018 | Liu | H04W 28/0205 |
| 10,375,699 | B2* | 8/2019 | Jeon | H04W 72/542 |
| 10,462,834 | B2* | 10/2019 | Agarwal | H04W 28/0958 |
| 10,485,000 | B2* | 11/2019 | Shaheen | H04W 36/0022 |
| 2021/0068129 | A1* | 3/2021 | Ryu | H04L 5/0055 |
| 2022/0007399 | A1* | 1/2022 | Rastegardoost | H04L 5/0073 |
| 2022/0141851 | A1* | 5/2022 | Gross | H04W 28/0231 370/329 |
| 2022/0167448 | A1* | 5/2022 | Palle | H04W 36/00692 |
| 2022/0191737 | A1* | 6/2022 | Mindler | H04W 28/0967 |
| 2023/0397046 | A1* | 12/2023 | Sahin | H04W 28/0865 |
| 2024/0121765 | A1* | 4/2024 | Patel | H04W 72/51 |
| 2024/0163016 | A1* | 5/2024 | Li | H04L 1/1864 |

* cited by examiner

*Primary Examiner* — Alpus Hsu
(74) *Attorney, Agent, or Firm* — SHOOK, HARDY & BACON L.L.P.; Elena K. McFarland

(57) ABSTRACT

Methods are provided for determining that a traffic condition at a Primary Cell (PCell) used in New Radio Carrier Aggregation (NR CA) exceeds a congestion threshold. The method further includes determining that a user equipment (UE) attached to the PCell is disposed in a downlink coverage area of at least one Secondary Cell (SCell) used in the NR CA and based on the traffic condition at the PCell exceeding the congestion threshold and the UE being disposed in the downlink coverage area of the at least one SCell, reassigning at least a portion of downlink traffic between the PCell and the UE to a first SCell of the at least one SCell.

18 Claims, 8 Drawing Sheets

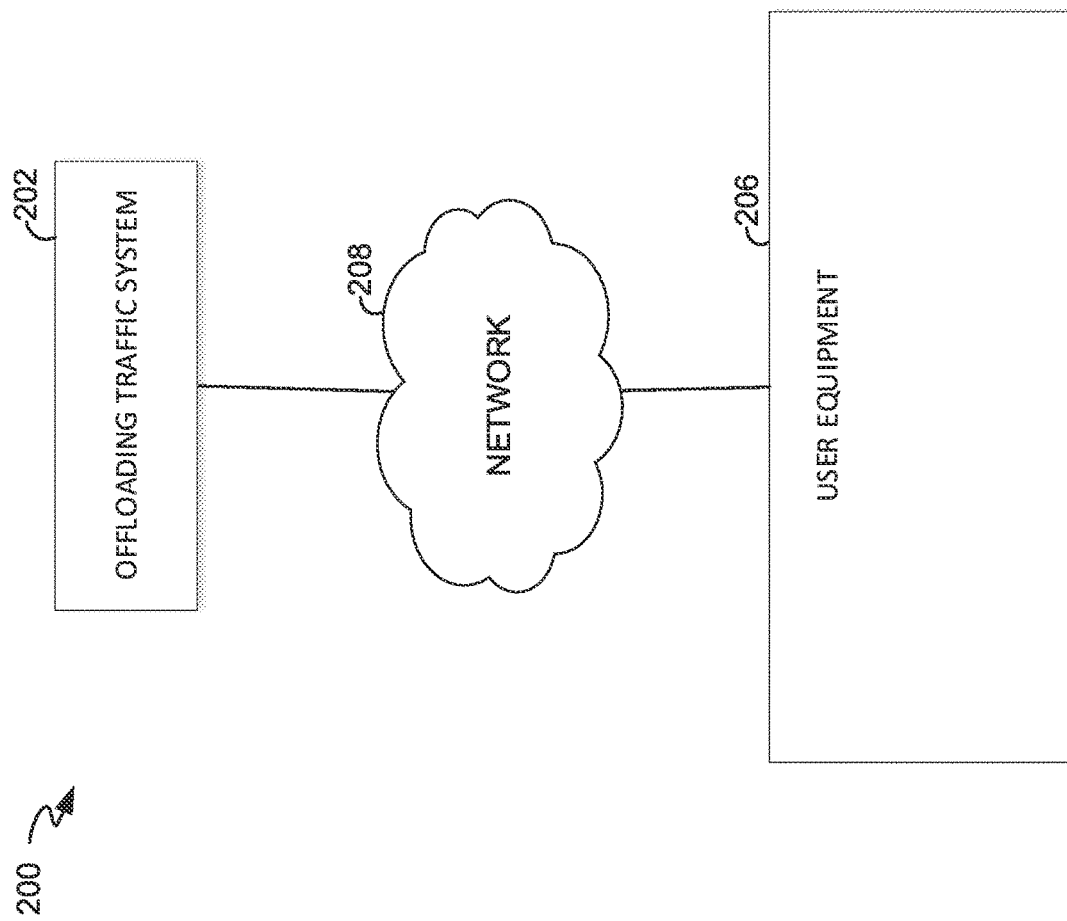

SYSTEM AND METHOD FOR OFFLOADING PCell CARRIER TRAFFIC TO SCell FOR FDD AND TDD 5G NR CARRIER AGGREGATION

BACKGROUND

With an ever increasing demand for data and an increase of users in a network system, operators such as communication operators, mobile operators, network operators and the like are finding new ways to use the existing spectrum efficiently. Some operators use multiple carriers to provide increased data capacity to their users. Multiple carriers allow the operators to provide capacity to cope with user requirements. By using carrier aggregation (CA), the operators are able to use multiple channels simultaneously to try to increase the bandwidth and speed of their networks. For example, operators are using NR carrier aggregation (NR CA), to combine multiple 5G NR carriers to increase throughput and improve spectral efficient. Some carrier networks include a primary cell (PCell) and a secondary cell (SCell). A user equipment (UE) is usually connected to the PCell as that is the main cell. Some networks find PCell suitable to assist with coverage and the SCell to assist with capacity. As such, operators are utilizing CA to combine multiple carriers to offer users a more bandwidth that can result in a faster data speed.

However, users are rapidly growing and requiring better experience for their broadband multimedia applications. Not only are users requiring a high speed internet, they also require excessive downlink capacity for their applications. Operators are seeing the need to provide faster downloads that can support a greater number of users. As such, a solution is needed that can provide a more efficient system to control traffic between multiple carriers in a network.

SUMMARY

Embodiments of the present disclosure related to, among other things, a system and method to offload traffic in carrier aggregation systems. In one embodiment, the method includes determining that a traffic condition at a PCell used in New Radio Carrier Aggregation (NR CA) exceeds a congestion threshold. The method further includes determining that a user equipment (UE) attached to the PCell is disposed in a downlink coverage area of at least one SCell used in the NR CA. The method further includes reassigning at least a portion of downlink traffic between the PCell and the UE to a first SCell of the at least one SCell based on the traffic condition at the PCell exceeding the congestion threshold and the UE being disposed in the downlink coverage area of the at least one SCell.

In one embodiment, the PCell utilizes a first multiple access scheme and at least one SCell utilizes a second multiple access scheme. The first multiple access scheme is different than the second multiple access scheme. In one embodiment, the first multiple access scheme is a frequency division multiple access and the second multiple scheme is a time division multiple access. The method further comprises reassigning one or more UEs to the first SCell based on the traffic condition at the PCell exceeding the congestion threshold. The method further comprises determining if a traffic condition at the first SCell exceeds a congestion threshold and if the traffic condition at the first SCell does not exceed the congestion threshold, reassigning the at least the portion of downlink traffic between the PCell and the UE to the first SCell and if the traffic condition at the first SCell does exceed the congestion threshold, reassigning the at least the portion of downlink traffic between the PCell and the UE to a second SCell of the at least one SCell. In one embodiment, the downlink coverage area is beyond an uplink coverage area of the at least one SCell. The congestion threshold is based on a bandwidth of the PCell and a quantity of user equipment in a coverage extension area associated with the PCell. The method further comprises determining a quantity of user equipment to offload from the PCell to the first SCell, wherein the quantity of user equipment to offload is based on the traffic condition of the PCell and a traffic condition of the SCell. In one embodiment, the determination of the quantity of user equipment to offload from the PCell is based on a bandwidth ratio for the second SCell. The method further comprises reassigning a first portion of one or more UEs attached to the PCell to the first SCell, and a second portion of the one or more UEs to a second SCell. In one embodiment, the first portion and the second portion of the one or more UEs are determined based on a bandwidth ratio of the first SCell and the second SCell. In one embodiment, the bandwidth of the first SCell is greater than the bandwidth of the second SCell such that the first portion of the one or more UEs is greater than the second portion of the one or more UEs.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 2A is a diagram of an environment that can be used to perform the offloading traffic method, according to embodiments of the present disclosure.

DETAILED DESCRIPTION

There is an ever growing demand for data and an increase of users in a network system. Operators are finding new ways to allow users to share spectrum and also finding ways to use the existing spectrum efficiently. One of the ways operators are trying to maximize data capacity for users is by carrier aggregation (CA). CA allows operators to aggregate spectrum in different bandwidths and allows operators to offer higher speeds and capacity to users. For example, New Radio Carrier Aggregation (NR CA) is a method to combine multiple 5G NR carriers to increase user throughput and improve spectral efficiency.

In some embodiments of a carrier aggregation, one carrier is termed as a PCell and another carrier is termed as a SCell. A user equipment (UE) can be connected to the PCell as that is the main cell. As such, a UE will communicate with the PCell as the main cell. Usually in the network, one PCell is always active and one or more SCells can be active. In one example, A PCell is equipped with a physical downlink control channel (PDCCH) and one physical uplink control channel (PUCCH). A SCell is equipped with a PDCCH and no PUCCH. As such a user on SCell has downlink capability and no uplink capability. NR CA can act as natural inter-carrier "load balancing" as traffic is spread between PCell and SCell.

Some operators use different access schemes for the PCell and the SCell. For example, in one embodiment, the PCell utilizes a first multiple access scheme and a SCell utilizes a second multiple access scheme. In one example, the first multiple access scheme is Frequency Division Multiple Access (FDMA) and the second multiple access scheme is Time Division Multiple Access Scheme (TDMA). In one example, the first multiple access is First Division Duplexing (FDD) or Time Division Duplexing (TDD). In one example, the first multiple access scheme uses separate frequencies for the uplink and downlink and the second multiple access scheme uses one frequency for both uplink and downlink. In some examples, the first multiple access scheme can provide a better coverage and the second multiple access scheme can provide a better capacity. Some networks find the first multiple access scheme suitable for PCell to assist with coverage and use the second multiple access scheme as the SCell to assist with capacity. In one example, the majority FDD and TDD NR CA deployment scenarios, the FDD carrier has much less bandwidth than TDD carrier, for example n71 10 MHz and n41 100 MHz NR CA. In one example, NR CA FDD as PCell and TDD as SCell can normally occur in the area where there is a lack of TDD uplink coverage (TDD coverage extension area).

Figure 1:
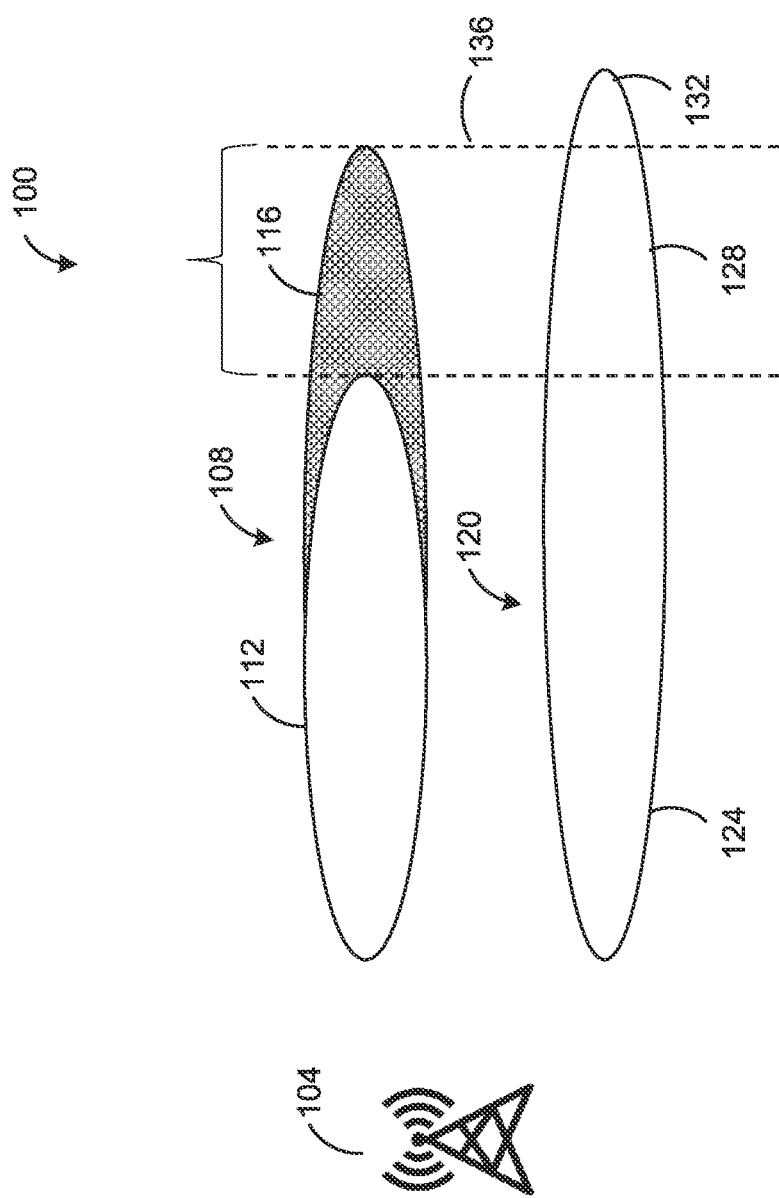
FIG. 1 is a diagram of an exemplary carrier aggregation system with multiple carriers in a network.

Turning to FIG. 1, FIG. 1 is an exemplary embodiment of carrier aggregation system with multiple carriers in a network. As seen in FIG. 1, the carrier aggregation system can include two carriers 108 and 120 and a base station 104. An operator can work through the base station 104 or through another system. One carrier 120 can be the PCell and the second carrier 108 can be the SCell.

As seen in FIG. 1, PCell 120 has more a larger coverage area than SCell. For example, portion 136 includes a coverage extension area 116. The PCell 120 extends to areas 128 and 132. The PCell 120 includes an area 128 which the same area as to the SCell downlink coverage area 116. However, PCell 120 extends to another area 132 where the SCell 108 does not have coverage. In the PCell 120 coverage space that covers area 124, 128, and 132, the PCell provides both uplink (UL) and downlink (DL) capability. In uplink coverage areas, users can upload data to the network. In downlink coverage areas, users can download data from the network. In the SCell 108, the coverage area 112 provides both uplink and downlink capability. In the SCell 108, the area 116 is a downlink coverage area 116 and provides only downlink capability and no uplink capability. In the SCell 108, the downlink coverage area (112 and 116) is beyond the uplink coverage area (only 112). The SCell 108 can provide a higher bandwidth than PCell 120. For example, the SCell 108 can provide 100 MHz bandwidth and the PCell 120 can provide 10 MHz bandwidth.

In one embodiment, users disposed in areas 112, 124 are closer to the base station 104 and have the capability to attach to 112 area of the SCell 108 by setting 112 as a higher priority than 124 area of the PCell 120. When users attach to the 112 area of the SCell 108, the 112 area can provide a higher bandwidth and allows capability for uplink and downlink. In one example, the 112 area is not the target for the PCell Offload.

Users disposed in areas 128, 116 are further away the base station 104. Users disposed in area 128 of the PCell 120 have uplink and downlink capability and have the capability to attach to SCell 108 with downlink capability (no uplink capability).

Users disposed in area 132 are further away from the base station 104 and have the capability to attach to area 132 of the PCell 120 and have downlink and uplink capability. Users disposed in area 132 have no ability to attach to the SCell, because PCell's coverage area extends beyond the SCell's coverage area.

Accordingly, embodiments of the present disclosure are directed to offloading user equipment attached to the PCell 120 disposed in area 128, which is in a downlink coverage area 116 of at least one SCell 108, when the traffic condition at the PCell 120 exceeds the congestion threshold and the UE is disposed in the downlink coverage area 116 of at least one SCell. This can allow the operators to unlock even higher average speeds and better coverage for consumers. Since, in some examples, the SCell is more limited in coverage than the PCell in the same band, users can be offloaded to the SCell in the coverage extension area 136. Since users mostly need to download heavy applications, offloading users to the SCell extension area 116 can allow operators to provide users with a higher downlink capability and users who need uplink capability can use the PCell area 128. This allows the traffic load balance between the PCell and the SCell. The traffic load balance can allow for an improvement in user throughput and system spectral efficiency. It can also improve user experience in SCell downlink coverage area 116 since the users get to have a better downlink capability. Another advantage is that there is a flexibility on network deployment. In addition the PCell and SCell are aggregated in coverage extension areas 136 to serve the UE. By using Offloading Traffic System, the gNB can offload traffic from the PCell to the SCell in accordance with data activity. This will improve UE battery consumption and also assist in spectrum utilization.

As such, embodiments of the present disclosure allow traffic load balance between the PCell and SCell which can lead to improvement on user throughput and system spectral efficiency. Embodiments of the present disclosure also allow for improved user experience in the second multiple access scheme coverage extension area and flexibility on network deployment.

Turning to FIG. 2A, FIG. 2A is a diagram of an environment 200 that can be used to perform the offloading traffic method, according to embodiments of the present disclosure. It can be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 7.

Environment 200 is an example of a suitable architecture for implementing certain aspects of the present disclosure. In one embodiment, environment 200 includes, among other components not shown, an offloading traffic system 202 and a user equipment 206. Each of the offloading traffic system 202 and user equipment 206 shown in FIG. 2A can comprise one or more computer devices, such as the computing device 700 of FIG. 7 discussed below. The offloading traffic system 202 may be embodied at least partially by the instructions. Therefore, the offloading traffic system 202 can operate on a server or on a user device, such as user equipment 206, or partially on multiple devices. As shown in FIG. 2A, the offloading traffic system 202 and the user equipment 206 can communicate via a network 208, which may include, without limitation, one or more local area networks (LANs) and/or wide area networks (WANs). Such networking environments are commonplace in offices, enterprise-wide computer networks, intranets, and the Internet. It can be understood that any number of user devices and offloading traffic systems may be employed within environment 200 within the scope of the present disclosure. Each may comprise a single device or multiple devices cooperating in a distributed environment. For instance, the offloading traffic system 202 could be provided by multiple devices collectively providing the functionality of the offloading traffic system 202 as described herein. Additionally, other components not shown may also be included within the network environment.

It can be understood that any number of user equipment 206, offloading traffic systems 202 and other components can be employed within the operating environment 200 within the scope of the present disclosure. Each can comprise a single device or multiple devices cooperating in a distributed environment.

User equipment 206 can be any type of computing device capable of being operated by a user. For example, in some implementations, user equipment 206 is the type of computing device described in relation to FIG. 7. By way of example and not limitation, a user equipment 206 may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user equipment 206 can include one or more processors, and one or more computer-readable media. The computer-readable media may include computer-readable instructions executable by the one or more processors. The instructions may be embodied by one or more applications.

The application(s) may generally be any application capable of facilitating performance of data transmission through unused channels (e.g., via the exchange of information between the user equipment(s) and the offloading traffic system 202). In some implementations, the application(s) comprises a web application, which can run in a web browser, and could be hosted at least partially on the server-side of environment 200. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, an application in a base station such as a gNB can initiate the offloading traffic system 202.

In embodiments, the offloading traffic system 202 determines that a traffic condition at a PCell used in a New Radio Carrier Aggregation (NR CA) exceeds a congestion threshold. For example, a congestion threshold for the PCell is a maximum value of users that are acceptable in the PCell. The offloading traffic system 202 determines that a UE attached to the PCell is disposed in a downlink coverage area of at least one SCell used in the NR CA. The offloading traffic system 202 will reassign at least a portion of the downlink traffic between the PCell and the UE to a first SCell of the at least one SCells based on the traffic condition at the PCell exceeding the congestion threshold and the UE being disposed in the downlink coverage area of the at least one SCell. The offloading traffic system 202 can also determine if a traffic condition at the first SCell exceeds a congestion threshold. If the traffic condition at the first SCell does not exceed the congestion threshold, at least the portion of downlink traffic is reassigned between the PCell and the UE to the first SCell. If the traffic condition at the first SCell does exceed the congestion threshold, at least the portion of downlink traffic is reassigned between the PCell and the UE to a second SCell of the at least one SCell.

In one embodiment, the offloading traffic system 202 determines a quantity of user equipment to offload from the PCell to the first SCell by reassigning the user equipment to the SCell. In one embodiment, the offloading traffic system offloads a portion of the PCell traffic to the respective SCells. The quantity of user equipment to offload can be based on factors such as the traffic condition of the PCell, a traffic condition of the SCell, bandwidth ration for a second SCell or the like. The PCell congestion threshold can change and may need to be determined again. In one example, the PCell congestion threshold is based on factors such as the bandwidth of the PCell and a quantity of user equipment in a coverage extension area associated with the PCell. In one example, the Offloading Traffic System 202 determines the quantity of user equipment to offload from the PCell based on the bandwidth ratio of the first SCell and a second SCell. In one example, one or more UEs are reassigned to the first SCell based on the traffic condition at the PCell exceeding the PCell congestion threshold. In another example, a first portion of two or more UEs attached to the PCell are reassigned to the first SCell and a second portion of the one or more UEs are reassigned to the second SCell. The first portion and the second portion of the UEs can be determined based on the bandwidth of the first SCell and the second SCell. In one example, if the first portion of the UEs is greater than the second portion of the UEs, then the bandwidth of the first SCell is greater than the bandwidth of the second SCell. The PCell congestion threshold can be calculated by. Congestion threshold can be based on the amount of data in the buffer, PRB utilization, CCE utilization and number of active users.

For cloud-based implementations, the instructions on offloading traffic system 202 may implement one or more aspects of the offloading traffic system 202, and application 220 may be utilized by a user and/or system to interface with the functionality implemented on server(s). In some cases, application 220 comprises a web browser. In other cases, offloading traffic system 202 may not be required. For example, the functionality described in relation to the offloading traffic system 202 can be implemented completely on a user device, such as user equipment 206.

These components may be in addition to other components that provide further additional functions beyond the features described herein. The offloading traffic system 202 can be implemented using one or more devices, one or more platforms with corresponding application programming interfaces, cloud infrastructure, and the like. While the offloading traffic system 202 is shown separate from the user equipment 206 in the configuration of FIG. 2A, it can be understood that in other configurations, some or all of the functions of the offloading traffic system 202 can be provided on the user equipment 206.

Figure 2B:
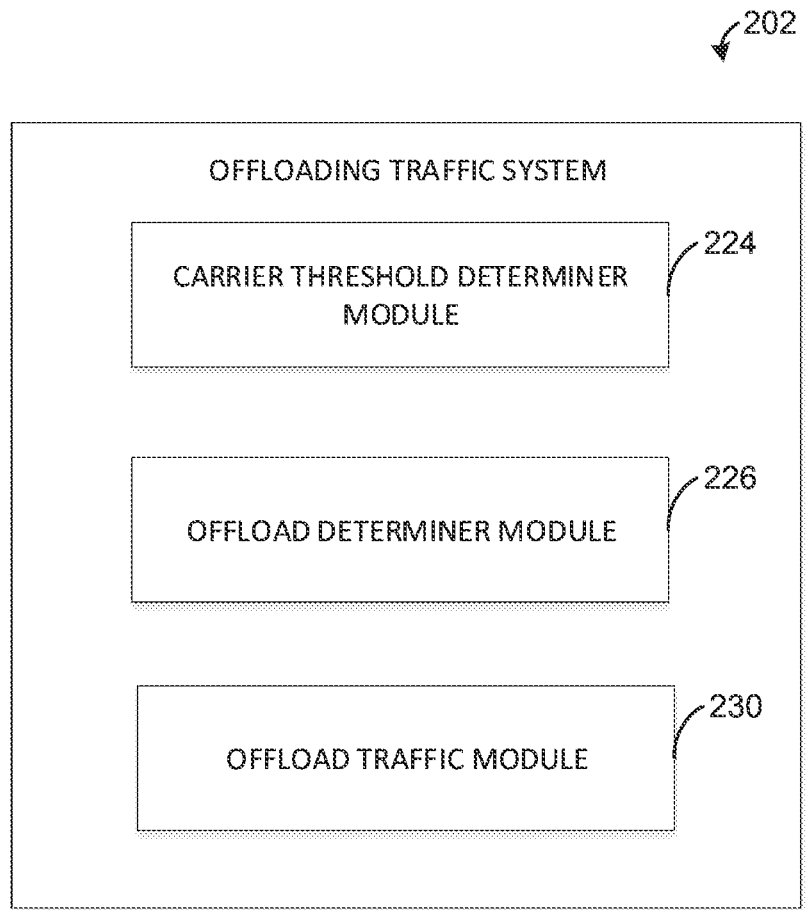
FIG. 2B provides an exemplary offloading traffic system, in accordance with embodiments described herein.

Turning to FIG. 2B, FIG. 2B provides an exemplary offloading traffic system 202. As shown, an exemplary offloading traffic system 202 includes a channel identifier module 224, a data decoding module 226, and a data transmitting module 230. As can be appreciated, any number of components may be used to perform the various functionalities described herein.

In accordance with some embodiments of the offloading traffic system 200, the congestion threshold determined module 224 determines the threshold for PCells and SCells in the carrier aggregation system. For example, if the carrier aggregation system has one PCell and two SCells, the offloading traffic system 200 will determine the congestion threshold value for the PCell and each of the SCells. The threshold value for each carrier can change and may needs to be determined.

In accordance with some embodiments, the offloading traffic system 200 includes an offload determined module 226. The offload determiner module 226 determines the quantity of user equipment that can be offloaded from the PCell to each of the SCells in the offloading traffic system 200. To determine how many users can be offloaded from the PCell, the system determines the quantity of user equipment in the PCell greater than the PCell congestion threshold and/or determines the quantity of user equipment that will be offloaded to each of the SCells in the offloading traffic system 200.

In accordance with some embodiments, the offloading traffic system 200 further includes an offload traffic module 230. The offload traffic module 230 is used to offload the traffic from the PCell to the SCells in the offloading traffic system 200. In one example, any users who are in the coverage extension area and use FDD as PCell can be subject of PCell offload if the thresholds are met.

Figure 3:
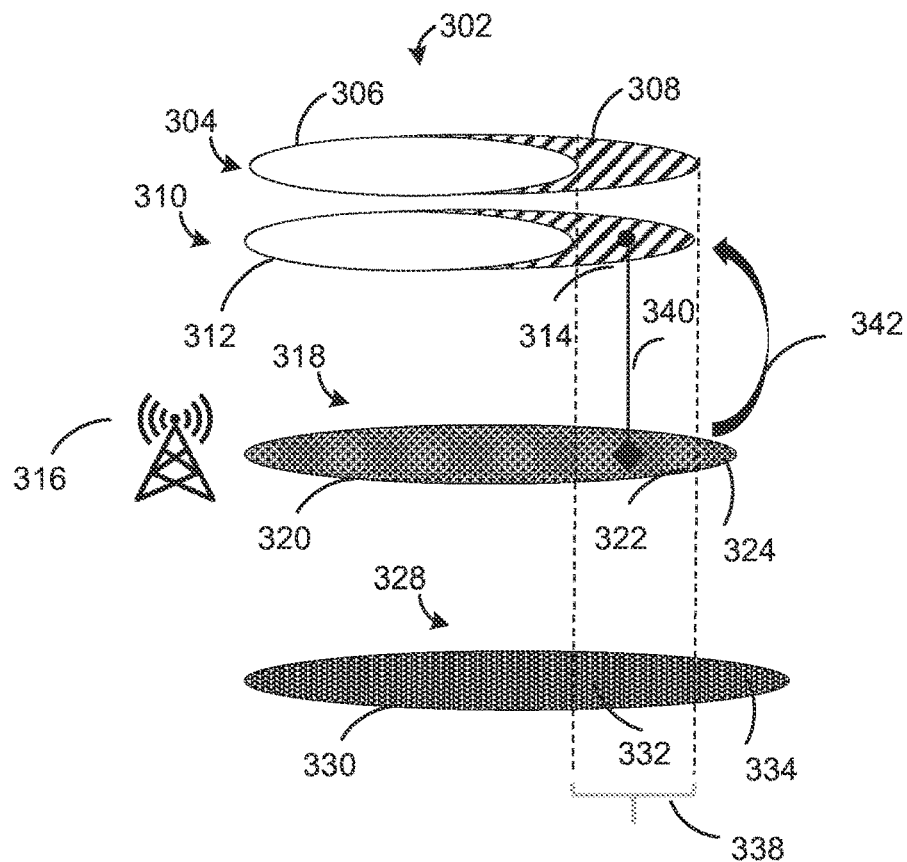
FIG. 3 is an exemplary offloading traffic system 302 for an exemplary 2 component carrier (2 CC) in accordance with one embodiment of the present disclosure.
Figure 3:
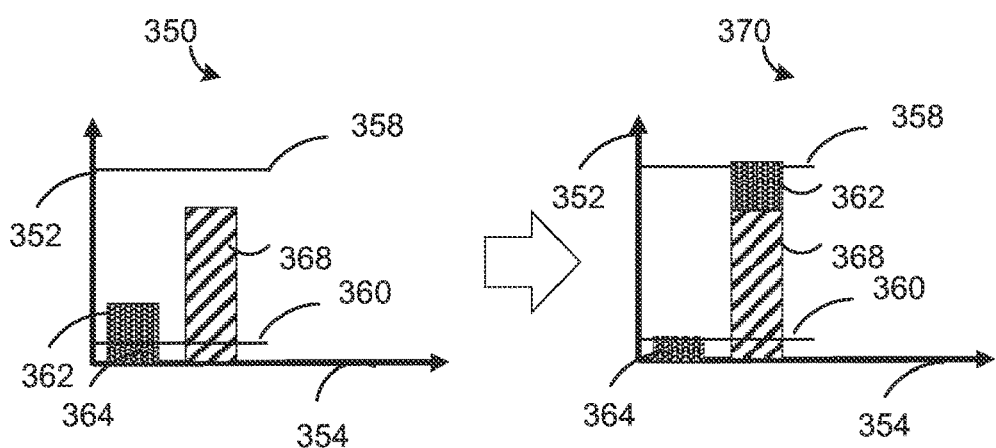

With reference to FIG. 3, FIG. 3 is an exemplary offloading traffic system 302 for an exemplary 2 Component Carrier (2 CC) in accordance with one embodiment of the present disclosure. There can be multiple carriers such as a first SCell 304, a second SCell 310, a first PCell 318 and a second PCell 328. The SCells 304, 310 includes areas 306, 312 closer to the base station 316 where the SCells provide both uplink and downlink capability. In the area 338, the SCells 304, 310 include downlink coverage areas 308, 314 that are away from the base station 316. In downlink coverage areas 308, 314, the SCell 304, 310 provides only downlink capability.

In this embodiment, two PCells 318, 328 are also present. PCells 318, 328 have areas 320, 330 near the base station 316, areas 322, 332 in the downlink coverage areas, and areas 324, 334 furthest away from the base station 316. PCells 318, 328 are able to provide uplink and downlink coverages in all of the PCell coverage areas 320, 330, 332, 324, 330, 332, 334.

In one embodiment, the offloading traffic system 302 includes a carrier aggregation 340 by combining two carriers, one PCell 318 and one SCell 310. The offloading traffic system 302 can determine the quantity of PCell user equipment and SCell user equipment in the coverage extension area 338.

The offloading traffic system 302 determines the PCell congestion threshold 360 and the SCell congestion threshold 358. In one example, a PCell is first multiple access scheme with lower bandwidth and SCell is second multiple access scheme with wider bandwidth. To prevent ping pong on PCell offloading, hysteresis on PCell can be applied. In one example, the Offloading traffic system 302 determines whether a traffic condition at the PCell exceeds a congestion threshold and whether a user equipment attached to the PCell exceeds the congestion threshold and the UE disposed in the downlink coverage area of at least one SCell. As illustrated in graph 350, the total number of PCell user equipment disposed in the PCell area 322 include areas 362 and 364. Area 364 illustrates the amount of PCell users in area 322 is not greater than the PCell congestion threshold 360. Area 362 in the graph 350 illustrates PCell users that are greater than the PCell congestion threshold 360. If the total number of users in the PCell area 322 are greater than the PCell congestion threshold 360, the offloading traffic system 302 will offload the amount of PCell users 362 greater than the PCell congestion threshold 360 to at least one SCell coverage extension area 314 (downlink coverage are 314). As illustrated in graph 370, the amount 362 is reassigned to the SCell. In this example, it can be noted that the total amount of SCell users in area 314 are not greater than the SCell congestion threshold 358. User equipment can be reassigned from PCell to SCell if buffer occupancy on PCell is greater than the threshold.

Figure 4:
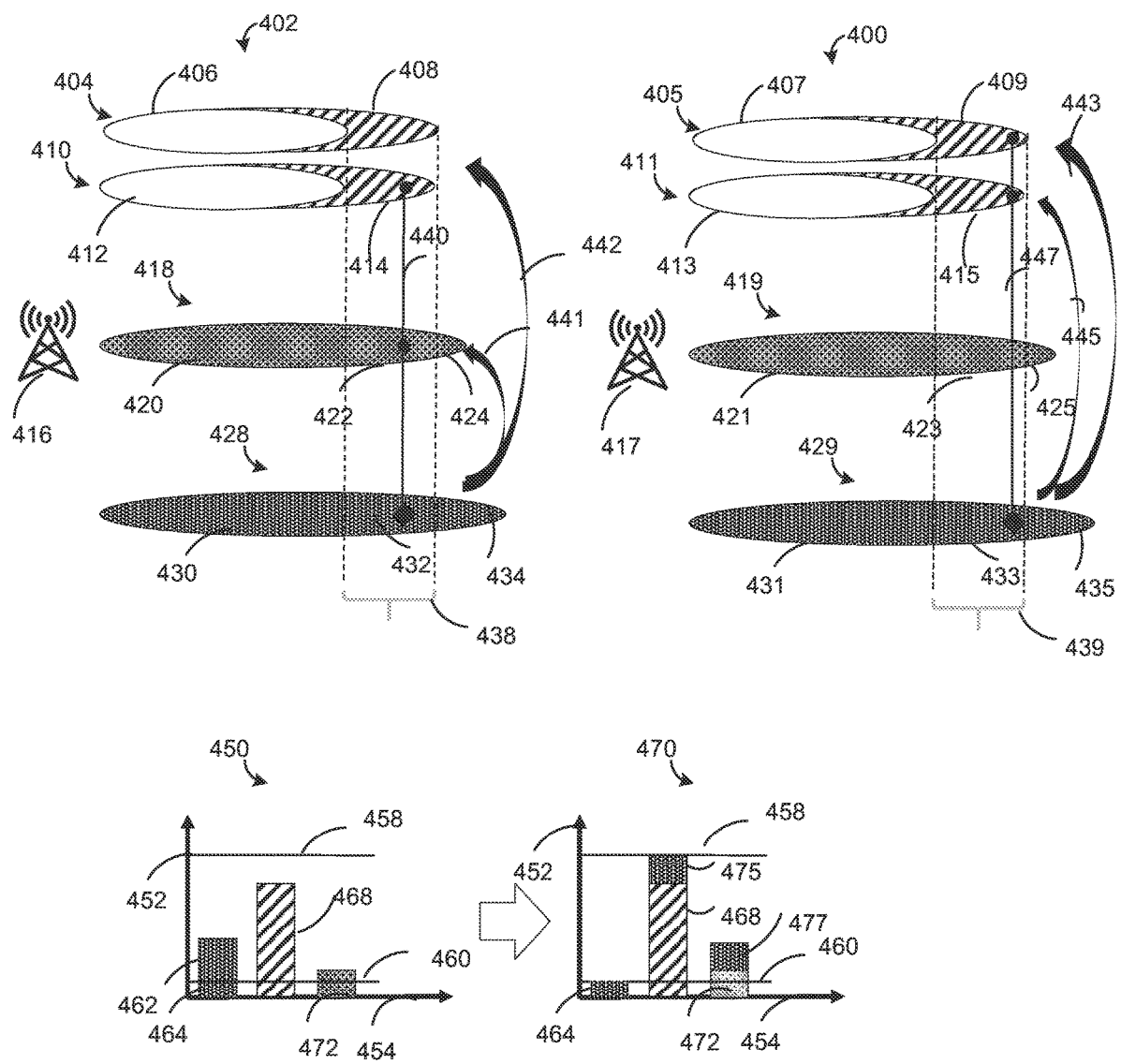
FIG. 4 are offloading traffic systems for exemplary 3 component carriers (3 CC) in accordance with one embodiment of the present disclosure.

With reference to FIG. 4, FIG. 4 are offloading traffic systems 400, 402 for exemplary 3 Component Carriers (3 CC) in accordance with one embodiment of the present disclosure. In an exemplary offloading traffic system 402, there can be multiple carriers such as a SCell 404, another SCell 410, a PCell 418 and another PCell 428. The SCells 404, 410 include areas 406, 412 closer to the base station 416 where the PCells provides both uplink and downlink capability. In the coverage extension area 438, the SCells 404, 410 include downlink coverage areas 408, 414 that are away from the base station 416. In SCells downlink coverage areas 408, 414, the SCells 404, 410 provides only downlink capability.

In this embodiment, two PCells 418, 428 are also present in the offloading traffic system 402. The PCells 418, 428 have areas 420, 430 near the base station 416, areas 422, 432 disposed in the SCell downlink coverage areas 408, 414, and areas 424, 434 furthest away from the base station 416. PCells 418, 428 are able to provide uplink and downlink coverages in all of the PCells coverage areas 420, 430, 432, 424, 430, 432, 434.

The offloading traffic system 400, 402 determines the amount of PCell user equipment and SCell user equipment in the coverage extension area 432, 433. As further illustrated in graphs 450, 470, the offloading traffic systems 400, 402 includes user equipment 462, 464 in the PCell and user equipment 468 in the first SCell 418, 411 in the coverage extension area 422, 415 and user equipment 472 in the second SCell 410, 405 in the coverage extension area 414, 409. In one embodiment, the offloading traffic system 400, 402 determines the PCell congestion threshold 460 and the SCell congestion threshold 458.

In one example, the Offloading traffic system 400, 402 determines whether the total amount user equipment 462, 464 in the PCell area 432, 433 is greater than the PCell congestion threshold 460. As illustrated in graph 450, the total amount of PCell user equipment in the PCell area 432, 433 include areas 462 and 464. Area 464 illustrates the amount of PCell user equipment in area 432, 433 is not greater than the PCell congestion threshold 460. Area 462 in the graph 450 illustrates PCell user equipment that are greater than the PCell congestion threshold 460.

If the total amount of user equipment in the PCell area 432, 433 are greater than the PCell congestion threshold 460, the offloading traffic system 400, 402 will offload a portion of the PCell user equipment 462 by reassigning the offloaded portion between the two SCells. For example, in the offloading traffic system 402, some of the offloaded amount 441 of area 462 will be reassigned to the first SCell 418 and the rest of the offloaded amount 442 of the area 462 will be reassigned to the second SCell 404. In another example, in the offloading traffic system 400, some of the amount 445 of area 462 will go to the first SCell 411 and the rest of the amount 443 of the area 462 will go to the second SCell 405.

In one example, the offloading traffic system 400, 402 will offload all the PCell user equipment 462 that exceed the PCell congestion threshold amount 460 to one SCell until the total user equipment in the SCell in the coverage extension area 438, 439 is greater than that SCell's congestion threshold. When the total user equipment in the SCell in the coverage extension area 438, 439 is greater than that SCell's congestion threshold, the rest of the PCell user equipment 462 will be offloaded to the second SCell. As illustrated in graph 470, the amount 462 is offloaded and combined with the user equipment 468 in a first SCell. However, since the total amount of user equipment in the first SCell reached the SCell congestion threshold 458 by adding a portion of the amount 462, the rest of the amount 462 can be added to the second SCell 472. If traffic that has been offloaded to SCell has reached the threshold, the rest of PCell traffic will be reassigned into the next SCell.

Figure 5:
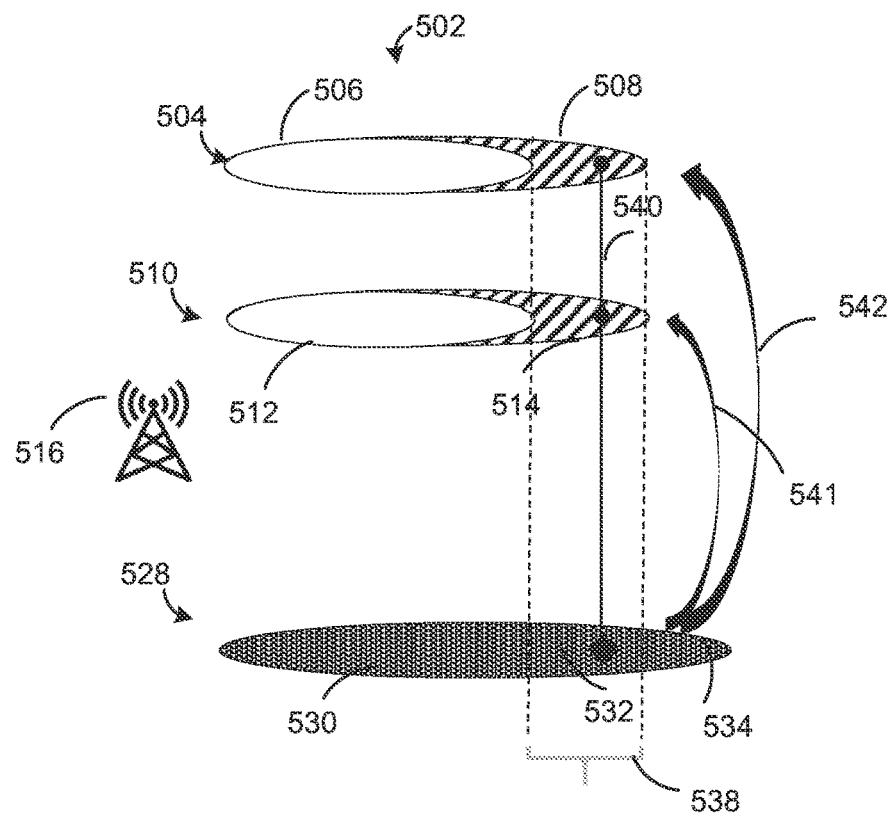
FIG. 5 is an offloading traffic systems for an exemplary 3 component carrier (3 CC) in accordance with one embodiment of the present disclosure.
Figure 5:
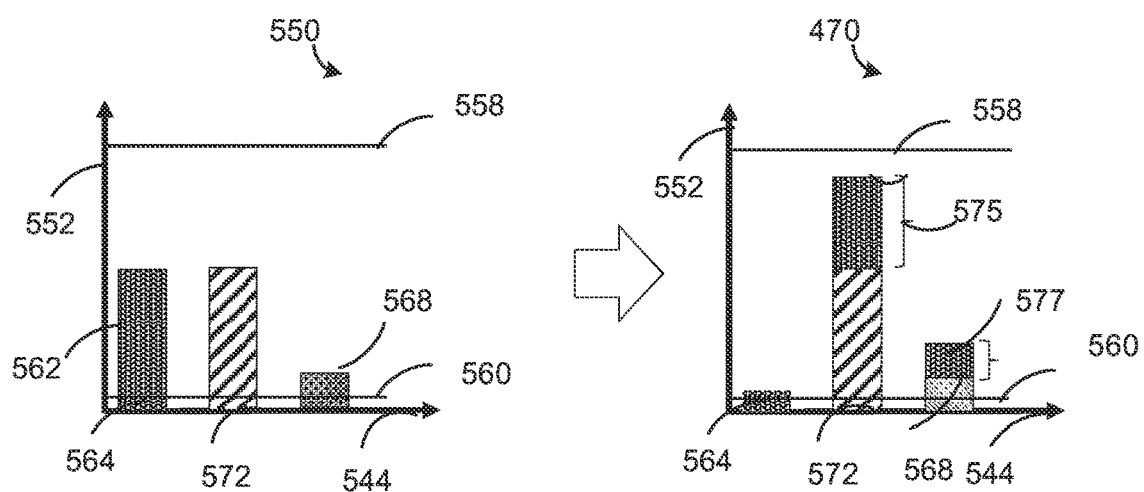

Turning to FIG. 5, FIG. 5 is an offloading traffic systems 502 for an exemplary 3 Carrier Component (3 CC) in accordance with one embodiment of the present disclosure. In an exemplary offloading traffic system 402, there can be multiple carriers such as a SCell 504, another SCell 510, and a PCell 528. The SCells 504, 510 include areas 506, 512 closer to the base station 516 where the SCell provides both uplink and downlink capability. In the coverage extension area 538, the SCells 504, 510 include downlink coverage areas 508, 514 that are away from the base station 516. In the SCells' downlink coverage areas 508, 514, the SCell 504, 510 provides only downlink capability.

In this embodiment, a PCell 528 is also present in offloading traffic system 502. PCell 528 has an area 530 near the base station 516, area 532 in the SCell downlink coverage area 508, 514, and areas 534 furthest away from the base station 516. The PCell 528 is able to provide uplink and downlink coverages in all of the PCell coverage areas 530, 532, 534. In one embodiment, the offloading traffic system 502 includes a carrier aggregation 540 by combining three carriers thereby creating a 3 CC, one PCell 528 and two SCells 504, 510.

The offloading traffic system 502 determines whether a traffic condition at a PCell used in New Radio Carrier Aggregation (NR CA) exceeds a congestion threshold and that a user equipment attached to the PCell is disposed in a downlink coverage area of at least one SCell used in the carrier aggregation. In one embodiment, the offloading traffic system 502 determines the amount of PCell user equipment and SCell user equipment in the coverage extension area 532. As further illustrated in graphs 550, 570, the offloading traffic systems 502 includes user equipment 562, 564 in the PCell and user equipment 572 in the first SCell 510 in the coverage extension area 514 and includes user equipment 568 in the second SCell 504 in the coverage extension area 508. The offloading traffic system 502 determines the PCell congestion threshold 560 and the SCell congestion threshold 558.

In one example, the Offloading traffic system 502 determines whether the total amount of user equipment 562, 564 in the PCell area 532 is greater than the PCell congestion threshold 560. As illustrated in graph 550, the total amount of PCell user equipment in the PCell area 532 includes areas 562 and 564. Area 564 illustrates the amount of PCell user equipment in area 532 not greater than the PCell congestion threshold 560. Area 562 in the graph 550 illustrates PCell user equipment that are greater than the PCell congestion threshold 560.

If the total amount of user equipment in the PCell area 532 is greater than the PCell congestion threshold 560, the offloading traffic system 502 will offload a portion of the PCell user equipment 562 and divide it between the two SCells 504, 510. For example, in the offloading traffic system 502, a first portion 575 of area 562 will go to the first SCell 504 and a second portion 577 of the area 562 will go to the second SCell 510.

In one example, the offloading traffic system 502 distributes the amount of PCell user equipment among the SCells using a ratio. The ratio can be determined using one or more factors such as the bandwidth of the SCells, the amount of user equipment in the carrier, a combination of the factors, or the like. For example, assuming that the first SCell 504 has a bandwidth of 100 MHz and the second SCell 510 has a bandwidth of 50 MHz, the total bandwidth provided by the SCells is 100 MHz+50 MHz=150 MHz Therefore, for the first SCell: 100/150=67% of the PCell user equipment 562 will be offloaded to the first SCell. For the second SCell: 50/150=33% of PCell user equipment will be offloaded to the second SCell. It can be understood that there are other methods of determining how much of the traffic will be offloaded to each SCell.

If the offloading traffic system 502 determines that with the percentage, the amount of user equipment in the coverage extension area 538 increases in the SCell so that the amount of user equipment in the SCell coverage extension area 538 is greater than the SCell congestion threshold 558, the offloading traffic system 502 can reassign the remaining amount of user equipment from the SCell that is greater than the SCell congestion threshold in another SCell. It can be understood that for multiple SCell scenario, the percentage of traffic to be offloaded from PCell to SCell can be adjusted according to SCell bandwidth. Higher SCell bandwidth can be configured with higher ratio than lower SCell bandwidth. The PCell ratio can also be configured according the bandwidth.

While some 2 CC and 3 CC examples have been described, it can be understood that the system can include any amount of carriers in any combination. It can be understood that while examples herein discuss offloading user equipment from a PCell to a SCell, offloading can occur to any with any bandwidth.

Figure 6:
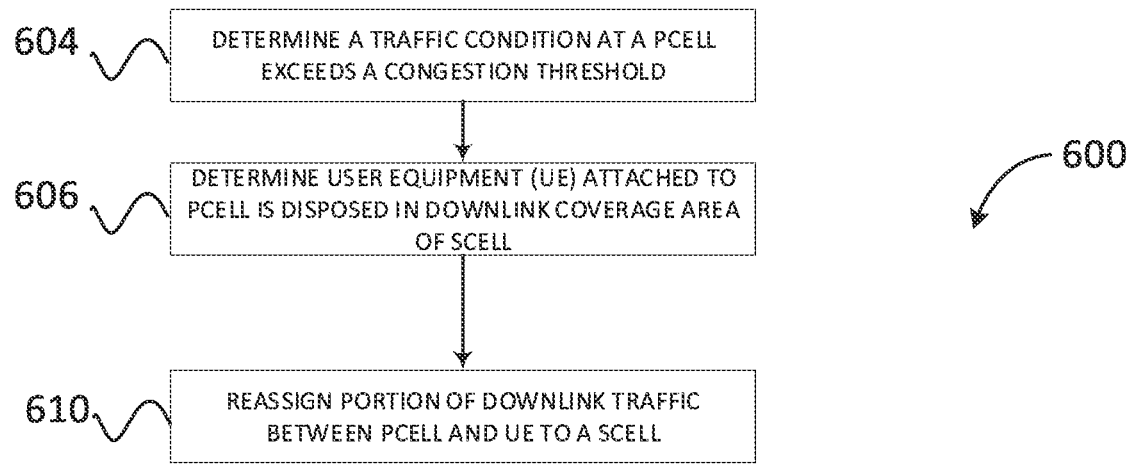
FIG. 6 is a flow diagram illustrating an exemplary method for implementing the offloading traffic method in accordance with one embodiment of the present disclosure.

With reference to FIG. 6, FIG. 6 is a flow diagram illustrating an exemplary method 600 for facilitating offloading traffic in accordance with one embodiment of the present disclosure. A processing device such as a user equipment, a server, a cloud computing service or the like implements the exemplary method 600. The offloading traffic system can initiate the offloading traffic method 600 as described herein.

As shown in FIG. 6, in one embodiment, at block 604, an offloading traffic system determines that a traffic condition at a PCell exceeds a congestion threshold such as a PCell congestion threshold. The PCell congestion threshold is a maximum value of user equipment that are acceptable in the PCell and can be based on the bandwidth of the PCell and quantity of users in a coverage extension area associated with the PCell. The PCell utilizes a first multiple access scheme such as a frequency division multiple access and the SCell utilizes a second multiple access scheme such as a time division multiple access. The offloading traffic system determines a quantity of user equipment to offload from the PCell to a first SCell based on the traffic condition of the PCell and the traffic condition of the SCell.

The offloading traffic system, at block 606, determines that a UE attached to the PCell is disposed in a downlink coverage area of at least one SCell used in the CA.

The offloading traffic system, at block 610, reassigns at least a portion of the downlink traffic between the PCell and the UE to a first SCell of the at least one SCell. In one embodiment, one or more UEs are reassigned to the first SCells based on the traffic condition at the PCell. If the traffic condition at a first SCell does not exceeds a congestion threshold such as a SCell congestion threshold, then a portion of the downlink traffic between the PCell and the UE is reassigned to the first SCell and if the traffic condition at the first SCell does exceed a congestion threshold such as a SCell congestion threshold, then a portion of the downlink traffic between the PCell and the UE is reassigned to the second SCell. In another embodiment, a first portion of the UEs attached to PCell are assigned to a first SCell and a second portion of the UEs attached to the PCell are assigned to a second SCell. This can be based on the bandwidth of the first SCell and the second SCell. For example, if the bandwidth of the first SCell is greater than the bandwidth of the second SCell, then the first portion of the UEs is greater than the second portion of the UEs.

Figure 7:
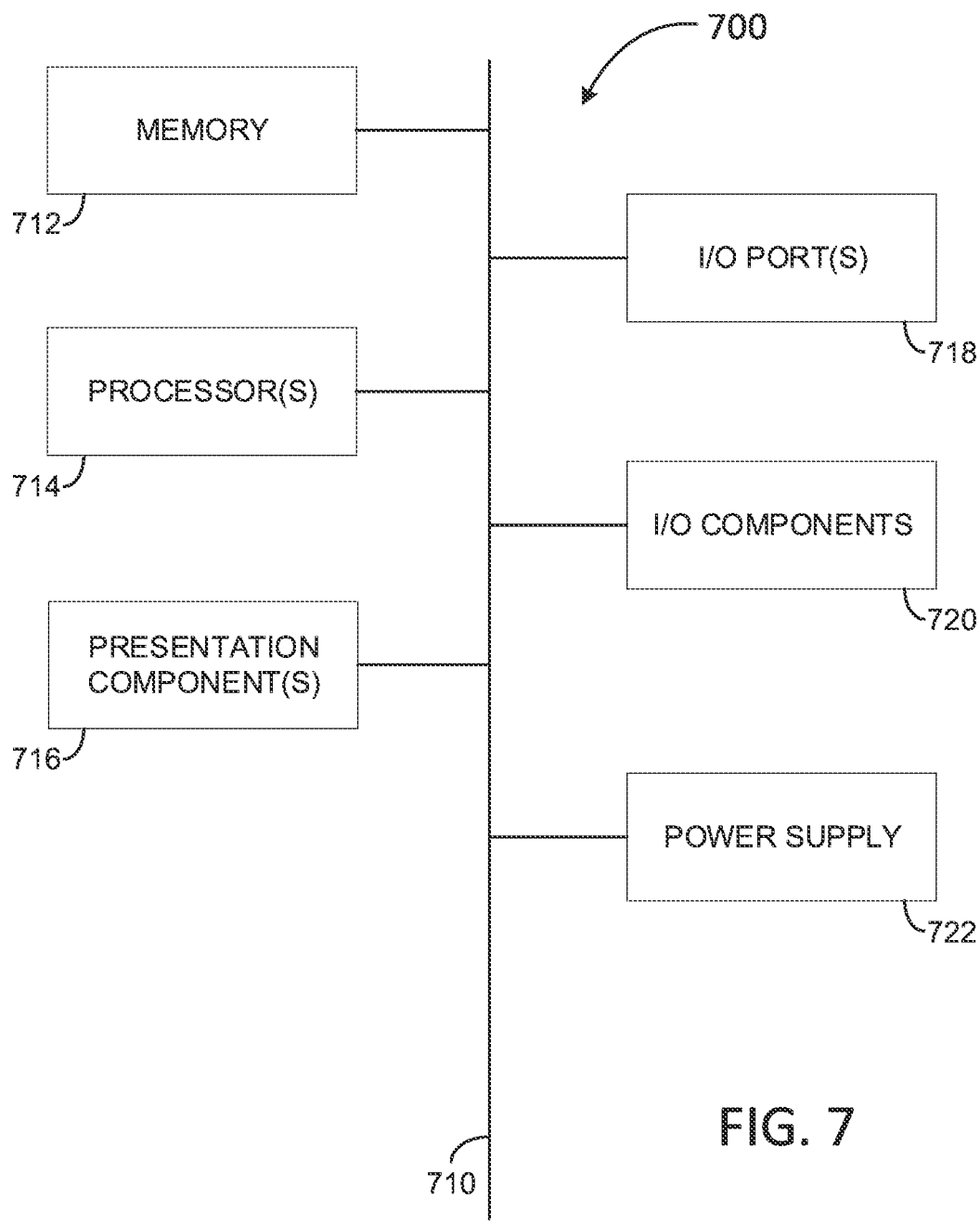
FIG. 7 is an exemplary operating environment for implementing embodiments of the present technology.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user and/or system or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user and/or system interface (NUI) that processes air gestures, voice, or other physiological inputs generated by a user and/or system. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion.

Aspects of the present technology have been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it can be understood that any amount of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to greater than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms cannot be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however, the distributed computing environment depicted herein is merely exemplary. Components can be configured for performing certain embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for offloading one or more user equipment (UE) in a carrier aggregation communications system, the method comprising:
   determining that a traffic condition at a Primary Cell (PCell) used in New Radio Carrier Aggregation (NR CA) exceeds a congestion threshold;
   identifying the one or more UE that are attached to the PCell and disposed in a downlink coverage area of at least one Secondary Cell (SCell) used in the NR CA; and
   based on the traffic condition at the PCell exceeding the congestion threshold and the one or more UE being disposed in the downlink coverage area of the at least one SCell, reassigning at least a portion of the one or more UE to a first SCell of the at least one SCell.

2. The method of claim 1, wherein the PCell utilizes a first multiple access scheme and the at least one SCell utilizes a second multiple access scheme, wherein the first multiple access scheme is different than the second multiple access scheme.

3. The method of claim 2, wherein the first multiple access scheme is frequency division multiple access, and wherein the second multiple access scheme is time division multiple access.

4. The method of claim 1, further comprising:
   determining that a traffic condition at the first SCell exceeds a congestion threshold;
   and
   reassigning a subset of the at least the portion of the one or more UE to a second SCell of the at least one SCell.

5. The method of claim 1, wherein the downlink coverage area is beyond an uplink coverage area of the at least one SCell.

6. The method of claim 1, wherein the congestion threshold is based on a bandwidth ratio of the PCell and a quantity of the one or more UE in a coverage extension area associated with the PCell.

7. The method of claim 1, further comprising determining a quantity of the one or more UE to offload from the PCell to the first SCell, wherein the quantity of user equipment to offload is based on the traffic condition of the PCell and a traffic condition of the first SCell.

8. The method of claim 7, wherein the determination of the quantity of the one or more UE to offload from the PCell is based on a bandwidth ratio for the first SCell.

9. The method of claim 1, further comprising reassigning a first portion of one or more UEs attached to the PCell to the first SCell, and a second portion of the one or more UEs to a second SCell.

10. The method of claim 9, wherein the first portion and the second portion of the one or more UEs are determined based on a bandwidth ratio of the first SCell and the second SCell.

11. The method of claim 10, wherein the bandwidth of the first SCell is greater than the bandwidth of the second SCell such that the first portion of the one or more UEs is greater than the second portion of the one or more UEs.

12. One or more non-transitory computer-readable media having a plurality of executable instructions embodied thereon, which, when executed by one or more processors, cause the one or more processors to perform a method for transmitting additional data through a communication stream, the method comprising:
  determining that a traffic condition at a Primary Cell (PCell) used in New Radio Carrier Aggregation (NR CA) exceeds a congestion threshold;
  determining that one or more user equipment (UE) attached to the PCell is disposed in a downlink coverage area of at least one Secondary Cell (SCell) used in the NR CA; and
  based on the traffic condition at the PCell exceeding the congestion threshold and the UE being disposed in the downlink coverage area of the at least one SCell, reassigning at least a portion of the one or more UE to a first SCell of the at least one SCell.

13. The one or more non-transitory computer-readable media of claim 12, wherein the PCell utilizes a first multiple access scheme and the at least one SCell utilizes a second multiple access scheme, wherein the first multiple access scheme is different than the second multiple access scheme.

14. The one or more non-transitory computer-readable media of claim 13, wherein the first multiple access scheme is frequency division multiple access, and wherein the second multiple access scheme is time division multiple access.

15. The one or more non-transitory computer-readable media of claim 12, further comprising:
  determining that a traffic condition at the first SCell exceeds a congestion threshold;
  and
  reassigning a subset of the at least the portion of UE to a second SCell of the at least one SCell.

16. The one or more non-transitory computer-readable media of claim 12, wherein the downlink coverage area is beyond an uplink coverage area of the at least one SCell.

17. The one or more non-transitory computer-readable media of claim 12, wherein the congestion threshold is based on a bandwidth of the PCell and a quantity of user equipment in a coverage extension area associated with the PCell.

18. A computer system comprising:
  one or more processors; and
  one or more non-transitory computer-readable storage media, coupled with the one or more processors, having instructions stored thereon, which, when executed by the one or more processors, cause the computing system to provide:
  means for determining that a traffic condition at a Primary Cell (PCell) used in New Radio Carrier Aggregation (NR CA) exceeds a congestion threshold;
  means for determining that one or more a user equipment (UE) attached to the PCell is disposed in a downlink coverage area of at least one Secondary Cell (SCell) used in the NR CA; and
  means for reassigning at least a portion of the one or more UE to a first SCell of the at least one SCell based on the traffic condition at the PCell exceeding the congestion threshold and the at least the portion of the one or more UE being disposed in the downlink coverage area of the at least one SCell.

* * * * *